United States Patent [19]

Okaguchi

[11] Patent Number: 5,783,897
[45] Date of Patent: Jul. 21, 1998

[54] VIBRATING GYROSCOPE

[75] Inventor: Kenjiro Okaguchi, Shiga-ken, Japan

[73] Assignee: Murata Manufacturing Co., Ltd., Japan

[21] Appl. No.: 578,265

[22] Filed: Dec. 26, 1995

[30] Foreign Application Priority Data

Dec. 27, 1994 [JP] Japan .................. 6-339032

[51] Int. Cl.⁶ .................. G01C 19/56; H01L 41/107
[52] U.S. Cl. .................. 310/316
[58] Field of Search .................. 310/316

[56] References Cited

U.S. PATENT DOCUMENTS

| | | | |
|---|---|---|---|
| 5,349,857 | 9/1994 | Kasanami et al. | 310/316 |
| 5,375,336 | 12/1994 | Nokamura | 310/316 |
| 5,412,204 | 5/1995 | Nakamura | 310/316 |
| 5,473,288 | 12/1995 | Kumada | 310/316 |
| 5,495,759 | 3/1996 | Nakamura | 310/316 |
| 5,505,085 | 4/1996 | Kasanami et al. | 310/316 |

FOREIGN PATENT DOCUMENTS

| | | | |
|---|---|---|---|
| 0658743 | 6/1995 | European Pat. Off. | G01C 19/56 |
| 6117860 | 4/1994 | Japan | 310/317 |

*Primary Examiner*—Thomas M. Dougherty
*Attorney, Agent, or Firm*—Ostrolenk, Faber, Gerb & Soffen, LLP

[57] ABSTRACT

A vibrating gyroscope in which harmonic components can be removed relatively easily and which can detect a rotational angular velocity accurately. The vibrating gyroscope 10 comprises a vibrator 12 in which detecting pieces 16a and 16b and a driving piece 16c are created on sides of a vibrating member 14, inverting amplifier circuits 24 and 26 for amplifying output signals of the detecting pieces 16a and 16b, a comparator circuit 32 for shaping waveform of output signals of the inverting amplifier circuits 24 and 26, a phase compensating circuit 34 for adjusting a phase of the output signal of the comparator circuit 32 and for feeding the output signal back to the driving piece 16c to stably vibrate the vibrating member, a differential circuit 38 for finding a difference of the output signals of the inverting amplifier circuits 24 and 26 and a synchronous detector circuit 40 for detecting the output signal of the differential circuit 38 in synchronism with the signal of the comparator circuit 32.

4 Claims, 6 Drawing Sheets

VIBRATING GYROSCOPE

BACKGROUND OF THE INVENTION

1. Field of the Invention

The present invention relates to a vibrating gyroscope and, more particularly, to a vibrating gyroscope for detecting a rotational angular velocity by utilizing flexural vibration of a vibrating member, for example.

2. Description of the Related Art

FIG. 7 is a circuit diagram illustrating one example of a prior art vibrating gyroscope. The vibrating gyroscope 100 includes a vibrator 102 which, in turn, comprises a columnar vibrating member 103 with an equilateral triangular cross-section and piezoelectric elements 104a, 104b and 104c on the sides of the vibrating member 103. The piezoelectric element 104c is connected to an oscillation circuit 105. An output end of the oscillation circuit 105 is connected to the piezoelectric elements 104a and 104b via a phase compensating circuit 106 and a variable resistor 107. The piezoelectric elements 104a and 104b are used for driving the vibrating member 103 so as to cause flexural vibration as well as for detecting signals corresponding to a rotational angular velocity. The piezoelectric elements 104a and 104b are also connected to a differential circuit 108. A synchronous detector circuit 109 detects an output signal from the differential circuit 108. The output signal from the oscillation circuit 105 is used as the synchronizing signal. The output signal synchronously detected by the synchronous detector circuit 109 is amplified by a DC amplifier 110.

In the vibrating gyroscope 100 described above, the vibrating member 103 flexurally vibrates in a direction crossing at right angles with the face where the piezoelectric element 104c is located as the output signal of the oscillation circuit 105, whose phase has been adjusted by the phase compensating circuit 106, is fed back to the driving piezoelectric elements 104a and 104b. In this case, output signals of chopped waves are obtained respectively from the piezoelectric elements 104a and 104b. Then, a rotational angular velocity may be detected by detecting any difference between the two chopped waves out of the piezoelectric elements 104a and 104b.

That is, when the vibrating member 103 is not rotating such that it is centered on the same axis as the vibrating member 103 flexurally vibrates, the signals obtained from the piezoelectric elements 104a and 104b are the same and the output signal from the differential circuit 108 indicates zero.

When the vibrating member 103 rotates such that it is centered on the same axis as the vibrating member 103 flexurally vibrates, the direction of the flexural vibration of the vibrating member 103 changes due to the Coriolis force. As a result, a difference is brought about between the output signals of the piezoelectric elements 104a and 104b, and the differential circuit 108 outputs a signal of the difference. Then, the synchronous detector circuit 109 detects the output signal from the differential circuit 108. Because a signal output from the synchronous detector circuit 109 at this time corresponds to the rotational angular velocity, the rotational angular velocity applied to the vibrating gyroscope 100 may be detected by measuring the signal.

However, because the difference of the chopped waves of the two piezoelectric elements 104a and 104b is sensed by the differential circuit and is detected in the prior art vibrating gyroscope as described above, harmonic components remain in the output signal after the synchronous detection.

As a result, the harmonic components cause a drift signal when the rotational angular velocity is very small or when temperature changes, thus preventing detection of the rotational angular velocity accurately. Further, it has been difficult to remove the harmonic components because the two piezoelectric elements 104a and 104b are used for driving the vibrating member, as well as for detecting the signals, and the output signals are complicated.

Accordingly, it is an object of the present invention to provide a vibrating gyroscope whose harmonic components can be removed relatively easily and which can detect a rotational angular velocity accurately.

SUMMARY OF THE INVENTION

The foregoing and other objects of the present invention are achieved by a vibrating gyroscope which comprises a vibrating member; a plurality of detecting pieces, provided on the vibrating member, for obtaining output signals corresponding to a rotational angular velocity; one driving piece, provided on a side of the vibrating member, for vibrating the vibrating member; means for sensing the output signals obtained from the detecting pieces and for generating a plurality of detection signals; an oscillator circuit responsive to the sensing and generating means for feeding a signal to the driving piece to provide a driving signal; a differential circuit for sensing any difference of the detection signals obtained from the sensing and generating means, and a synchronous detector circuit for detecting an output signal from the differential circuit in synchronism with a signal obtained from the oscillator circuit.

In accordance with a first aspect of the present invention, the oscillator circuit includes a comparator circuit for shaping the waveforms of the detection signals obtained from said sensing and generating means; and a phase compensating circuit for adjusting a phase of an output signal obtained from said comparator circuit and feeding the output signal back to said driving piece to provide the driving signal.

In accordance with a second aspect of the present invention, the sensing and generating means includes a plurality of amplifiers circuits connected respectively with the plurality of detecting pieces. The plurality of amplifier circuits amplify the output signals obtained from the plurality of detecting pieces and the comparator circuit shapes the waveform of the output signals obtained from the amplifier circuits. The phase compensating circuit adjusts the phase of the output signal obtained from the comparator circuit. The output signal obtained from the phase compensating circuit is fed back to the driving piece to stably vibrate the vibrating member. Further, the differential circuit senses any difference of the output signals out of the plurality of amplifier circuits and the difference is detected in synchronism with the signal from the comparator circuit.

In accordance with a third aspect of the present invention, the sensing and generating means includes a plurality of buffer circuits connected respectively to the plurality of detecting pieces. The buffer circuits convert the impedance of the output signals obtained from the plurality of detecting pieces into very small impedance and the comparator circuit shapes the waveform of the output signals obtained from the buffer circuits. The phase compensating circuit adjusts the phase of the output signal obtained from the comparator circuit. The output signal obtained from the phase compensating circuit is fed back to the driving piece to stably vibrate the vibrating member. Further, the differential circuit senses any difference of the output signals out of the buffer circuits and the difference is detected in synchronism with the signal from the comparator circuit.

In accordance with a fourth aspect of the present invention, the sensing and generating means includes a plurality of phase circuits connected respectively to the plurality of detecting pieces. The phase circuits adjust the phase of the output signals obtained from the plurality of detecting pieces and the comparator circuit shapes the waveform of the output signals obtained from the phase circuits. The phase compensating circuit adjusts the phase of the output signal obtained from the comparator circuit. The output signal obtained from the phase compensating circuit is fed back to the driving piece to stably vibrate the vibrating member. Further, the differential circuit senses any difference of the output signals out of the detecting pieces and the difference is synchronously detected in synchronism with the signal from the comparator circuit.

Because the vibrating member is driven by one driving piece and the detection is made by the plurality of detecting pieces, the output signals may be simplified. Further, the signal representing the rotational angular velocity may be clearly separated from the drift signal by detecting the output signal from the differential circuit in synchronism with the signal from the comparator circuit. As a result, harmonic components which may cause drift may be removed and the accuracy of detecting the rotational angular velocity may be improved by the relatively simple circuit. Further, when buffer circuits are employed, because the impedance of the output signals are converted by the buffer circuits, changes of the impedance of the vibrator affects the output signals less and the accuracy of detecting the rotational angular velocity may be improved further.

The above and other objects and features of the present invention will be apparent from a reading of the following detailed description of the preferred embodiment(s) in connection with reference to the accompanying drawings.

DETAILED DESCRIPTION OF THE PREFERRED EMBODIMENT(S)

Figure 1:
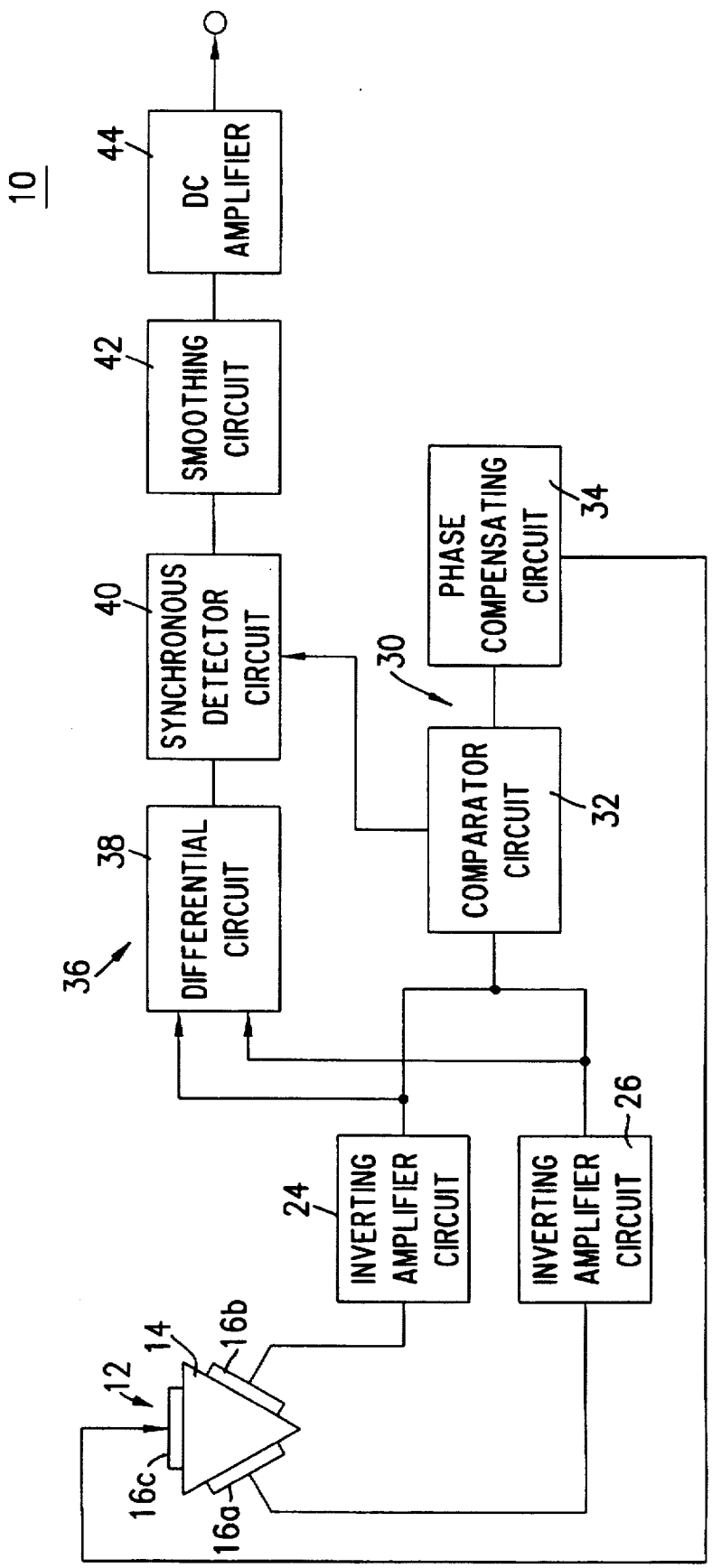
FIG. 1 is a circuit diagram illustrating one embodiment of the present invention.
Figure 2:
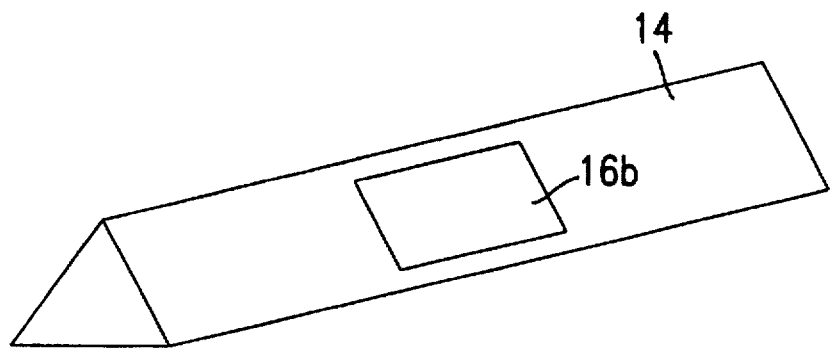
FIG. 2 is a perspective view of a vibrator used in a vibrating gyroscope shown in FIG. 1.

Referring now to the drawings, FIG. 1 is a circuit diagram illustrating one embodiment of a vibrating gyroscope 10 in accordance with the present invention. The vibrating gyroscope 10 includes a vibrator 12 which, in turn, comprises, as best seen in FIG. 2, a triangular, columnar vibrating element 14, i.e., a columnar vibrating element having a triangular, preferable, equilateral cross-section. The vibrating member 14 is made from a material which typically generates mechanical vibrations, such as elinver, iron-nickel alloy, silica, glass, quartz and ceramics.

Figure 3:
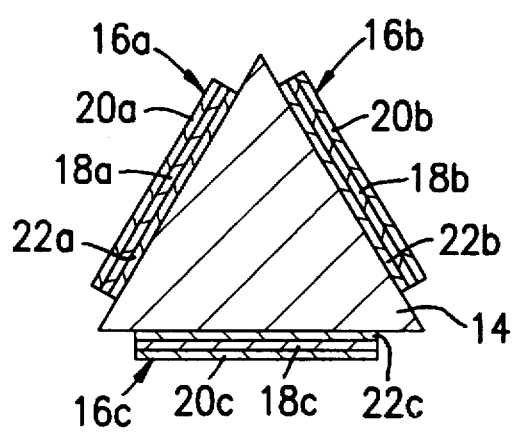
FIG. 3 is a section view of the vibrator shown in FIG. 2.

As shown in FIG. 3, located on the sides of the vibrating member 14 are detecting pieces 16a and 16b and a driving piece 16c. In the present embodiment, piezoelectric elements are used for the detecting pieces 16a and 16b and the driving piece 16c. The detecting piece 16a contains a piezoelectric plate 18a made from a piezoelectric ceramic, for example. Electrodes 20a and 22a are located on both sides of the piezoelectric plate 18a. One electrode 22a is attached to the vibrating member 14 using any suitable attachment method, such as pasting. Similarly, the detecting piece 16b and the driving piece 16c contain piezoelectric plates 18b and 18c, respectively, and electrodes 20b and 22b and electrodes 20c and 22c are created on both sides thereof, respectively. Respective electrodes 22b and 22c of the piezoelectric elements 16b and 16c are attached on the vibrating member 14 using any suitable attachment method, such as pasting. The detecting pieces 16a and 16b are used for feeding back signals when the vibrating member 14 is flexurally vibrated, as well as for detecting signals corresponding to a rotational angular velocity. The driving piece 16c is used to drive the vibrating member 14 to cause flexural vibration thereof and a driving signal is input to the driving piece 16c.

As shown in FIG. 1, the detecting pieces 16a and 16b are connected with inverting amplifier circuits 24 and 26, respectively. The inverting amplifier circuits 24 and 26 invert the polarity of the output signals obtained from the detecting pieces 16a and 16b and amplify them. Accordingly, the phase of the signals output from the inverting amplifier circuits 24 and 26 are shifted by 180° from the signals obtained from the detecting pieces 16a and 16b. The inverting amplifier circuits 24 and 26 are created by using operational amplifiers, for example.

Output ends of the inverting amplifier circuits 24 and 26 are connected to an oscillation circuit 30. The oscillation circuit 30 of the present embodiment comprises a comparator circuit 32 and a phase compensating circuit 34. The comparator circuit 32 shapes the waveforms of the output signals obtained from the inverting amplifier circuits 24 and 26 and the phase compensating circuit 34 compensates the phase of an output signal obtained from the comparator circuit 32 and supplies it to the driving piece 16c. Thus, the vibrating member 14 vibrates stably.

The output signals of the inverting amplifier circuits 24 and 26 are input also to a detecting circuit 36. The detecting circuit 36 comprises a differential circuit 38, a synchronous detector circuit 40, a smoothing circuit 42 and a DC amplifier 44. The output signals of the inverting amplifier circuits 24 and 26 are input respectively to the differential circuit 38 which outputs a difference of those output signals. The signal of this difference is detected by the synchronous detector circuit 40. That is, the synchronous detector circuit 40 detects the output signal from the differential circuit 38 in synchronism with the output signal of the comparator circuit 32. The signal detected by the synchronous detector circuit 40 is smoothed by the smoothing circuit 42 and is amplified by the DC amplifier 44.

In use of the vibrating gyroscope 10, the output signals of the detecting pieces 16a and 16b are fed back to the driving piece 16c. Thereby, the vibrating member 14 stably and flexurally vibrates in the direction crossing at right angles with the face on which the driving piece 16c is created. At this time, when the vibrating member 14 is not rotated, the signals output from the detecting pieces 16a and 16b are the same and the output signal obtained from the differential circuit 38 indicates zero. When the vibrating member 14 is rotated such that it is centered on the axis of vibration, the direction of the flexural vibration of the vibrating element 14 changes due to the Coriolis force. Thereby, a difference is brought about between the output voltages of the detecting pieces 16a and 16b and between the output signals of the inverting amplifier circuits 24 and 26 as well. The differential circuit 38 senses any difference of the output signals and the synchronous detector circuit 40 synchronously detects the output signal of the differential circuit 38. Because the signal thus synchronously detected corresponds to the rotational angular velocity, the rotational angular velocity applied to the vibrating gyroscope 10 may be detected by measuring the signal.

In the vibrating gyroscope 10, the output signals are simplified because the vibrating member 14 is driven by one driving piece 16c and the detection is made by two detecting pieces 16a and 16b. Further, because the output signal from the differential circuit 38 is synchronously detected in synchronism with the signal from the comparator circuit 32, the signal representing the rotational angular velocity may be clearly separated from a drift signal. As a result, harmonic components which may cause drift may be eliminated and the accuracy of detecting the rotational angular velocity may be improved by the relatively simple circuit as described above.

Figure 4:
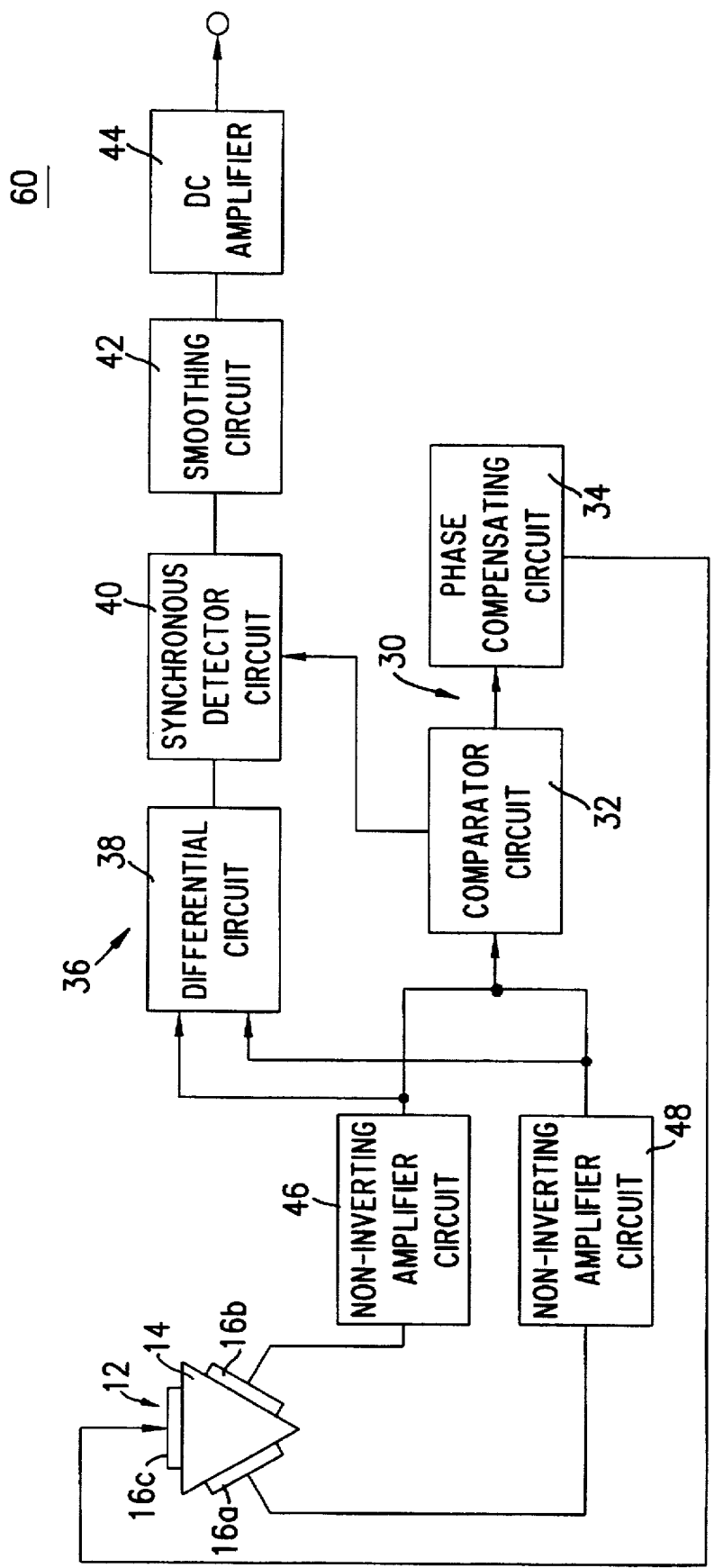
FIG. 4 is a circuit diagram illustrating another embodiment of the present invention.

FIG. 4 is a circuit diagram illustrating another embodiment of the present invention. In a vibrating gyroscope 60 of this embodiment, non-inverting amplifier circuits 46 and 48 are used instead of the inverting amplifier circuits 24 and 26 in the embodiment shown in FIG. 1. The same effect with the embodiment shown in FIG. 1 may be obtained also with this embodiment.

Figure 5:
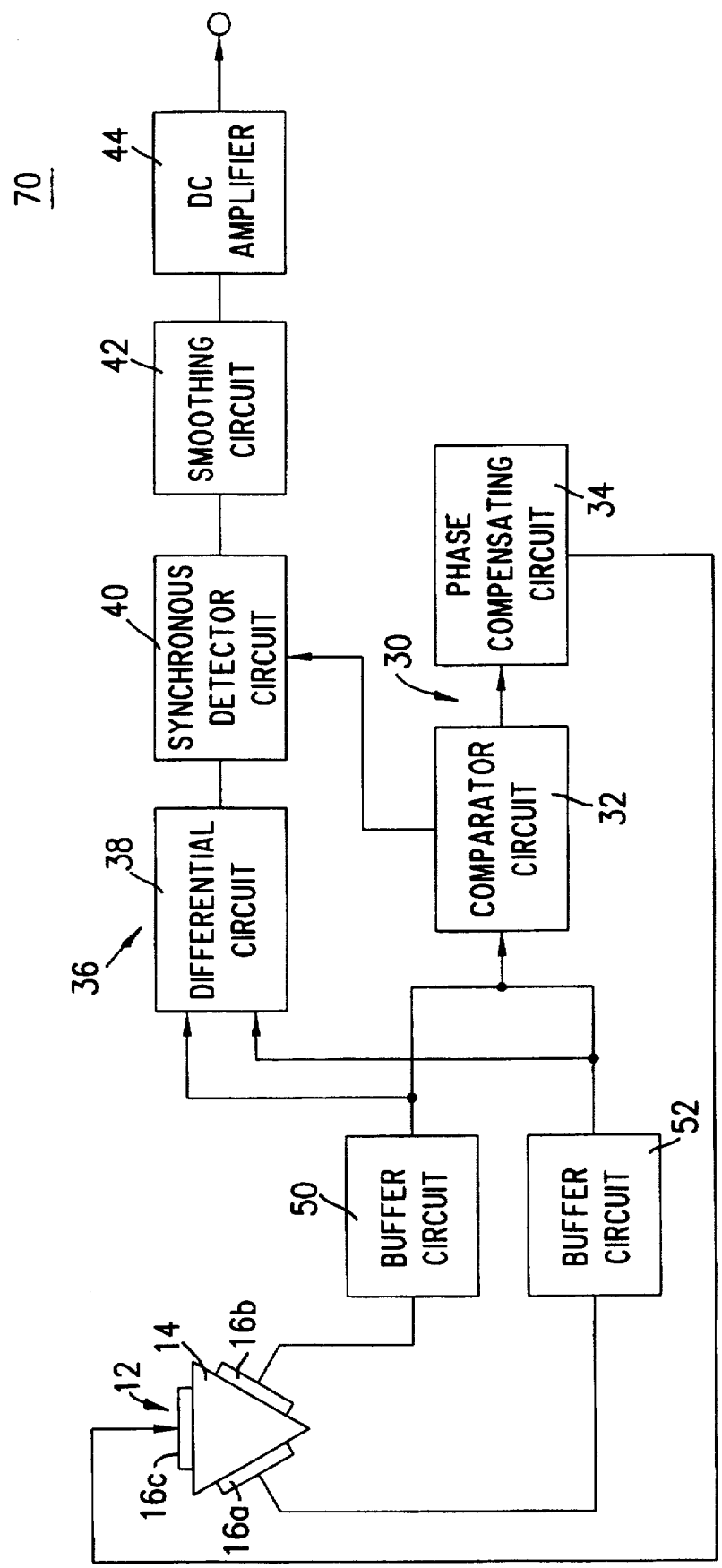
FIG. 5 is a circuit diagram illustrating a still other embodiment of the present invention.

FIG. 5 is a circuit diagram illustrating still another embodiment of the present invention. In a vibrating gyroscope 70 of this embodiment, buffer circuits 50 and 52 are used instead of the inverting amplifier circuits 24 and 26 in the embodiment shown in FIG. 1.

In the vibrating gyroscope 70, an impedance obtained respectively from two detecting pieces 16a and 16b are converted into a very small impedance by the buffer circuits 50 and 52. The comparator circuit 32 shapes the waveforms of the output signals obtained from the buffer circuits 50 and 52 and the phase compensating circuit 34 adjusts the phase of the output signal obtained from the comparator circuit 32. The output signal obtained from the phase compensating circuit 34 is fed back to the driving piece 16c to stably vibrate the vibrating member 14. The differential circuit 38 senses any difference of the output signals from the buffer circuits 50 and 52 and the synchronous detector circuit 40 synchronously detects the difference in synchronism with the signal from the comparator circuit 32.

The same effect with the embodiment shown in FIG. 1 may be obtained also with the embodiment shown in FIG. 5. Further, because the impedance of the output signals are converted by the buffer circuits 50 and 52, changes of the impedance of the vibrator 12 affect the output signals less. As a result, the accuracy of detecting the rotational angular velocity of the vibrating gyroscope 70 may be improved.

Figure 6:
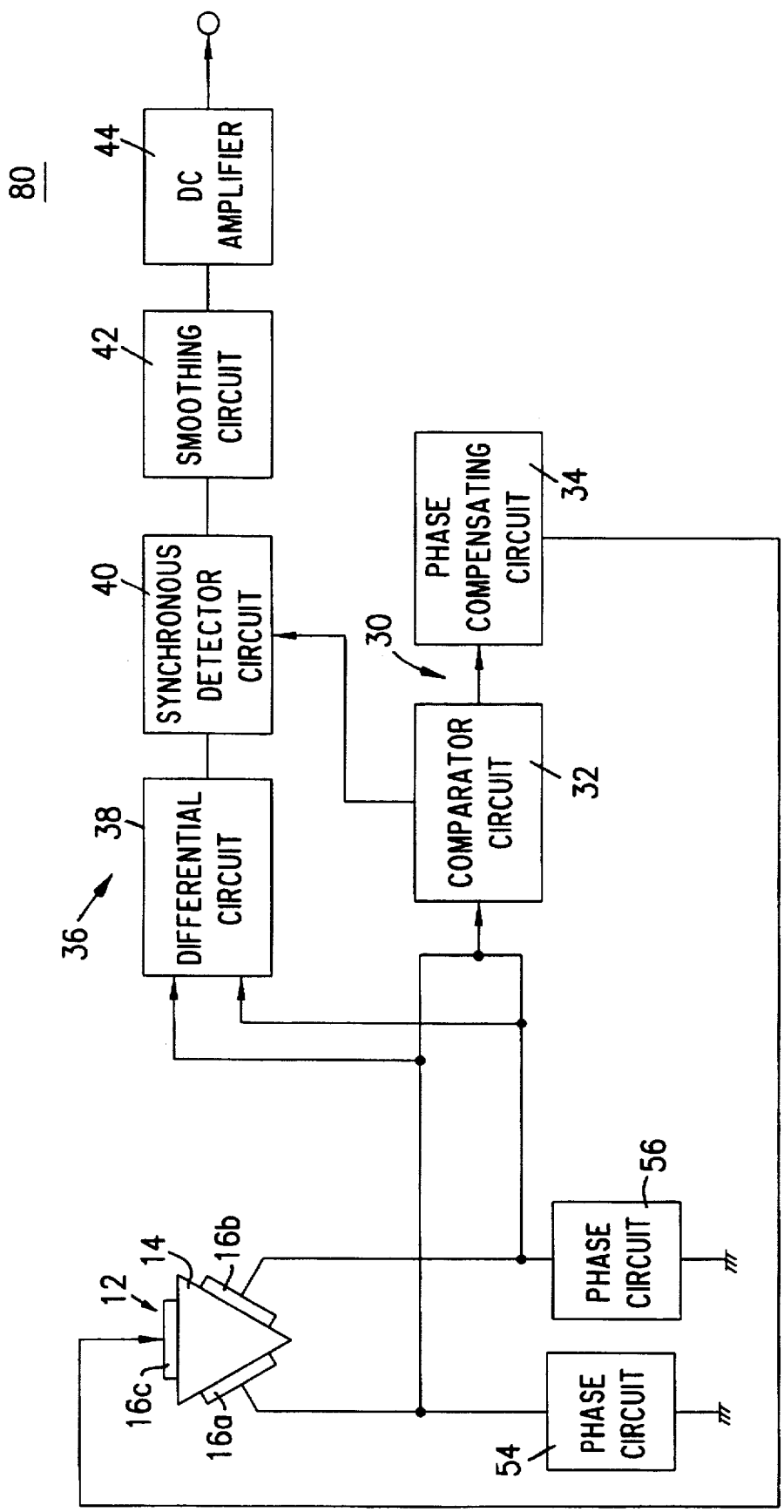
FIG. 6 is a circuit diagram illustrating a different embodiment of the present invention.
Figure 7:
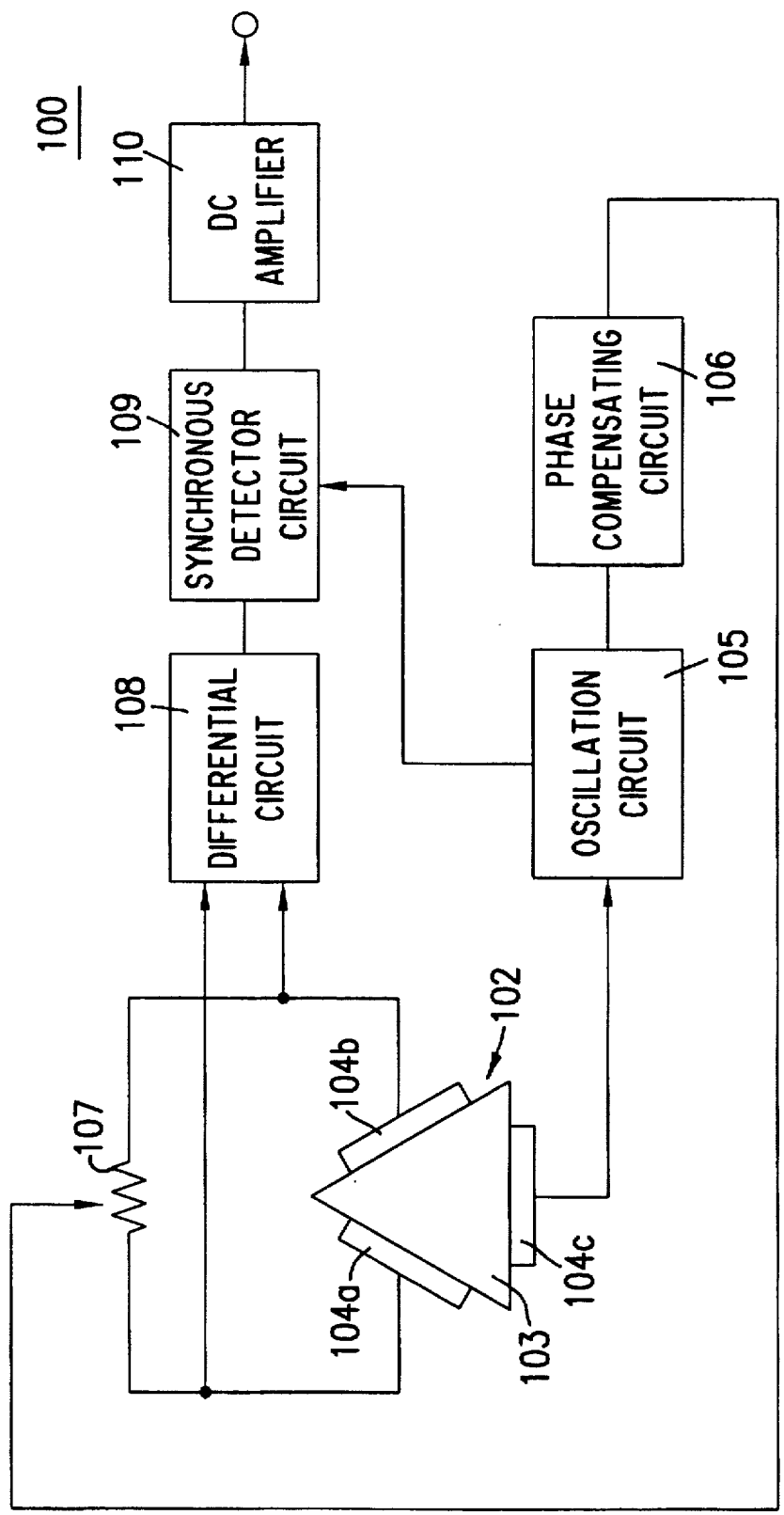
FIG. 7 is a circuit diagram illustrating one example of a prior art vibrating gyroscope.

FIG. 6 is a circuit diagram illustrating a further embodiment of the present invention. In a vibrating gyroscope 80 of this embodiment, phase circuits 54 and 56 are used instead of the inverting amplifier circuits 24 and 26 in the embodiment shown in FIG. 1. Phases of the output signals obtained from the two detecting pieces 16a and 16b are adjusted by the phase circuits 54 and 56. The comparator circuit 32 amplifies and shapes the output signals adjusted by the phase circuits 54 and 56 and the phase compensating circuit 34 adjust the phase of the output signal obtained from the comparator circuit 32. The output signal obtained from the phase compensating circuit 34 is fed back to the driving piece 16c to stably vibrate the vibrating member 14. The differential circuit 38 senses any difference of the output signals from the detecting pieces 16a and 16b and the synchronous detector circuit 40 synchronously detects the signal of the difference in synchronism with the signal from the comparator circuit 32.

The same effect with the embodiment shown in FIG. 1 may be obtained also with the embodiment shown in FIG. 6. Further, the signal representing the rotational angular velocity may be clearly separated from a drift signal by adjusting the phases of the output signals by the phase circuits 54 and 56. As a result, harmonic components may be removed and the accuracy of detecting the rotational angular velocity may be improved by the relatively simple circuit.

It is noted that although piezoelectric elements have been used as the driving piece 16c and the detecting pieces 16a and 16b in the embodiments described above, electrodes are used as the driving piece 16c and the detecting pieces 16a and 16b when the vibrating member 14 is made from a piezoelectric member. In this case, electrodes 16a and 16b serving as detecting pieces and an electrode 16c serving as a driving piece are formed on the sides of the vibrating member 14. Then, a rotational angular velocity may be detected in the same manner with the aforementioned embodiments by polarizing the vibrating member 14 in the direction crossing at right angles with the face on which the electrode 16c is created. The use of such vibrator also enables a vibrating gyroscope having less drift to be provided by driving the vibrating member 14 with a driving signal having a constant voltage and by detecting output currents of the electrodes 16a and 16b. The shape of the vibrating member 14 is not limited only to an equilateral triangular columnar shape but may be other shapes, such as prismatic or cylindrical.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibrating gyroscope, comprising:

a vibrating member;

a plurality of detecting pieces, provided on said vibrating member, for obtaining output signals corresponding to a rotational angular velocity;

one driving piece, provided on a side of said vibrating member, for vibrating said vibrating member;

means for sensing the output signals obtained from said detecting pieces and for generating a plurality of detection signals;

an oscillator circuit responsive to said sensing and generating means for feeding a signal to said driving piece to provide a driving signal, said oscillator circuit including a comparator circuit for shaping the waveforms of the detection signals obtained from said sensing and generating means, and a phase compensating circuit for adjusting a phase of an output signal obtained from said comparator circuit and feeding the output signal back to said driving piece as said driving signal;

a differential circuit for sensing any difference of the detection signals obtained from said sensing and generating means; and a synchronous detector circuit for detecting an output signal from said differential circuit in synchronism with said output signal obtained from said comparator circuit.

2. A vibrating gyroscope according to claim 1, wherein the sensing and generating means includes a plurality of amplifying circuits, connected respectively with said plurality of detecting pieces, for amplifying the output signals obtained from said detecting pieces; and wherein said differential circuit senses any difference of the output signals obtained from said plurality of amplifying circuits.

3. A vibrating gyroscope according to claim 1, wherein the sensing and generating means includes a plurality of buffer circuits, connected respectively to said plurality of detecting pieces, for converting impedances of the output signals obtained from said detecting pieces; and wherein said differential circuit senses any difference of the output signals obtained from said plurality of buffer circuits.

4. A vibrating gyroscope according to claim 1, wherein the sensing and generating means includes a plurality of phase circuits, connected respectively to said plurality of detecting pieces, for adjusting a phase of the output signals obtained from said detecting pieces; and wherein said differential circuit senses any difference of the output signals obtained from said plurality of detecting pieces.

* * * * *